(12) United States Patent
Davids et al.

(10) Patent No.: US 12,429,334 B1
(45) Date of Patent: Sep. 30, 2025

(54) SYSTEM AND METHOD FOR DETERMINING VERTICAL POSITION IN MULTI-FLOOR BUILDING

(71) Applicants: Cary N. Davids, Lisle, IL (US); Carol R. Davids, Lisle, IL (US)

(72) Inventors: Cary N. Davids, Lisle, IL (US); Carol R. Davids, Lisle, IL (US)

( * ) Notice: Subject to any disclaimer, the term of this patent is extended or adjusted under 35 U.S.C. 154(b) by 0 days.

(21) Appl. No.: 19/206,225

(22) Filed: May 13, 2025

Related U.S. Application Data

(60) Provisional application No. 63/647,707, filed on May 15, 2024.

(51) Int. Cl.
*G01C 5/06* (2006.01)
*H04W 4/90* (2018.01)

(52) U.S. Cl.
CPC .............. *G01C 5/06* (2013.01); *H04W 4/90* (2018.02)

(58) Field of Classification Search
CPC ........ G01C 5/06; G01C 21/206; G01C 25/00; G01C 21/20; G01C 21/1654; G01C 21/1656; G01C 5/00; G01C 21/005; G01C 21/28; G01C 21/383; G01C 25/005; G01C 17/38; G01C 21/3885; G01C 17/02; G01C 21/08; G01C 21/165; G01C 21/04; G01C 21/14; G01C 21/34; G01C 21/36; G01C 21/3407; G01C 21/3415; G01C 21/3461; G01C 21/3469; G01C 21/3492; G01C 21/3667; G01C 21/3691; G01C 21/3807; G01C 21/3841; G01C 21/3889; G01C 23/00; G01C 5/005; G01C 15/00; G01C 21/00; G01C 21/12; G01C 21/16; G01C 21/26; G01C 21/3859; G01C 21/30; G01C 21/3602; G01C 21/3629; G01C 21/3652; G01C 21/3685; G01C 21/3844; G01C 21/3848; G01C 21/3878; G01C 9/00; G01C 9/02; H04W 4/021; H04W 4/33; H04W 4/38; H04W 4/024; H04W 4/90; H04W 64/003
See application file for complete search history.

(56) References Cited

U.S. PATENT DOCUMENTS

| | | | |
|---|---|---|---|
| 5,339,351 | A * | 8/1994 | Hoskinson ............. H04M 11/04 379/49 |
| 7,272,394 | B2 | 9/2007 | Krishnakumar et al. |
| 8,990,043 | B1 | 3/2015 | Kolodziej |
| 9,116,230 | B2 | 8/2015 | Vartanian et al. |
| 9,234,965 | B2 | 1/2016 | Venkatraman |

(Continued)

FOREIGN PATENT DOCUMENTS

JP 2014157103 A 8/2014

*Primary Examiner* — Andre J Allen
(74) *Attorney, Agent, or Firm* — Bold IP, PLLC; Troy Schmelzer (57) ABSTRACT

A system and method for determining a floor number of a caller within a multi-floor building. A responder device obtains an entry floor barometric pressure from a barometric pressure sensor configured within the responder device, a barometric pressure of a caller device located within the building, and measurements of ambient temperature and relative humidity, which are used to determine a vertical height difference between the responder and caller devices. The floor number of the caller is determined based on the vertical height difference and the average floor height of the building.

20 Claims, 6 Drawing Sheets

(56) References Cited

U.S. PATENT DOCUMENTS

| | | |
|---|---|---|
| 9,485,626 B2 | 11/2016 | Pan et al. |
| 9,763,051 B2 | 9/2017 | Belghoul et al. |
| 9,794,755 B1 | 10/2017 | South et al. |
| 9,894,502 B2 | 2/2018 | Macias et al. |
| 9,970,757 B2 | 5/2018 | Das et al. |
| 9,986,529 B2 | 5/2018 | Palanki et al. |
| 10,051,684 B2 | 8/2018 | Edge |
| 10,064,017 B2 | 8/2018 | Han et al. |
| 10,070,259 B1 | 9/2018 | Ivanov et al. |
| 10,288,424 B2 | 5/2019 | Dormody et al. |
| 10,378,894 B2 | 8/2019 | Dormody et al. |
| 10,386,448 B2 | 8/2019 | Wolf et al. |
| 10,390,184 B2 | 8/2019 | Narayanan et al. |
| 10,393,854 B1* | 8/2019 | Wolfson .................. G01C 5/06 |
| 10,408,914 B1* | 9/2019 | Wolfson .................. G01S 19/45 |
| 10,477,358 B1 | 11/2019 | Dormody et al. |
| 10,514,258 B2 | 12/2019 | Dormody et al. |
| 10,598,486 B2 | 3/2020 | Dormody et al. |
| 10,602,476 B2 | 3/2020 | Dormody et al. |
| 10,631,129 B1 | 4/2020 | Pandit et al. |
| 10,655,961 B2 | 5/2020 | Dormody et al. |
| 10,656,236 B2 | 5/2020 | Wolfson et al. |
| 10,677,880 B2 | 6/2020 | Dormody et al. |
| 10,704,905 B2 | 7/2020 | Dormody et al. |
| 10,715,960 B2 | 7/2020 | Blaha, Jr. et al. |
| 10,805,452 B2 | 10/2020 | Alberth, Jr. et al. |
| 10,863,327 B2* | 12/2020 | Zhu ........................ H04W 4/38 |
| 10,921,121 B2 | 2/2021 | Dormody et al. |
| 11,064,320 B2 | 7/2021 | Dormody et al. |
| 11,073,441 B2 | 7/2021 | Dormody et al. |
| 11,181,365 B2 | 11/2021 | Nagarajan et al. |
| 11,196,855 B2 | 12/2021 | Alberth, Jr. et al. |
| 11,199,406 B2 | 12/2021 | Dormody et al. |
| 11,204,646 B2 | 12/2021 | Dormody et al. |
| 11,215,453 B2 | 1/2022 | Nagarajan et al. |
| 11,243,076 B2 | 2/2022 | Nagarajan et al. |
| 11,255,665 B2 | 2/2022 | Nagarajan et al. |
| 11,294,099 B1 | 4/2022 | Dormody et al. |
| D952,650 S | 5/2022 | Ashenden et al. |
| D952,671 S | 5/2022 | Ashenden et al. |
| D952,672 S | 5/2022 | Ashenden et al. |
| 11,333,567 B2 | 5/2022 | Dormody et al. |
| 11,418,914 B2 | 8/2022 | Dormody et al. |
| 11,445,354 B1 | 9/2022 | Brosowsky et al. |
| 11,460,298 B2 | 10/2022 | Han et al. |
| 11,536,564 B2 | 12/2022 | Dormody et al. |
| 11,555,699 B2 | 1/2023 | Dormody et al. |
| 11,579,036 B2 | 2/2023 | Dormody et al. |
| 11,592,595 B2 | 2/2023 | Seibert et al. |
| 11,644,310 B2 | 5/2023 | Vogedes et al. |
| 11,669,170 B2 | 6/2023 | Dormody et al. |
| 11,674,798 B2 | 6/2023 | Dormody et al. |
| 11,722,593 B2 | 8/2023 | Alberth et al. |
| 11,733,038 B2 | 8/2023 | Alberth et al. |
| 11,733,119 B2 | 8/2023 | Dormody et al. |
| 11,740,081 B2 | 8/2023 | Nagarajan et al. |
| 11,761,765 B2 | 9/2023 | Dormody et al. |
| 11,808,608 B2 | 11/2023 | Nagarajan et al. |
| 11,841,285 B2 | 12/2023 | Dormody et al. |
| 11,852,780 B1 | 12/2023 | Dormody |
| 11,892,295 B2 | 2/2024 | Dormody et al. |
| 11,913,809 B2 | 2/2024 | Nagarajan et al. |
| 11,991,605 B2 | 5/2024 | Dormody et al. |
| 12,025,471 B2 | 7/2024 | Han et al. |
| 12,038,280 B2 | 7/2024 | Dormody et al. |
| 12,061,096 B2 | 8/2024 | Dormody et al. |
| 12,101,689 B2 | 9/2024 | Dormody et al. |
| 12,130,155 B2 | 10/2024 | Dormody et al. |
| 2005/0176441 A1 | 8/2005 | Jurecka |
| 2012/0045039 A1* | 2/2012 | Dickinson ............... H04L 12/66<br>379/45 |
| 2015/0133145 A1* | 5/2015 | Palanki ............... H04W 64/006<br>455/456.1 |
| 2016/0047648 A1* | 2/2016 | Edge ........................ G01C 5/06<br>73/384 |
| 2017/0094471 A1* | 3/2017 | Sendonaris ............. H04W 4/30 |
| 2022/0128355 A1* | 4/2022 | Nagarajan ................ G01C 5/06 |
| 2022/0196401 A1* | 6/2022 | Wirola ..................... G01C 5/06 |
| 2022/0268962 A1 | 8/2022 | Yang et al. |
| 2023/0221203 A1 | 7/2023 | Dormody et al. |

* cited by examiner

SYSTEM AND METHOD FOR DETERMINING VERTICAL POSITION IN MULTI-FLOOR BUILDING

CROSS-REFERENCE TO RELATED APPLICATIONS

This application claims the benefit of priority of provisional application No. 63/647,707, filed on May 15, 2024, which is incorporated herein by reference.

BACKGROUND

Determining the vertical position of an emergency caller within a multi-floor or multi-story building is a critical challenge for emergency service providers such as police officers, firefighters, and medical personnel responding to emergencies and 9-1-1 calls. Traditional location determination technologies, such as the global positioning system (GPS), are often ineffective in indoor environments due to signal attenuation and distortion caused by building structural components. In dense metropolitan areas, additional interference from surrounding structures further degrades the reliability and precision of GPS data. Alternative methods for indoor location determination, such as Wi-Fi access points, Bluetooth low energy (BLE) beacons, and even crowd-sourced mapping data, have been explored with varying degrees of success. These approaches typically rely on the availability of external infrastructure or data that may not be present or reliable in all environments, particularly in emergency situations.

The vertical or z-axis location of a caller within a multi-floor structure is of particular interest to public emergency-calling services, such as 9-1-1 in the United States and equivalent three-digit systems in other countries. While the civic address or geographic x-y coordinates (in the form of latitude and longitude) of a multi-floor building in which the caller is located may be automatically provided by the caller device to the emergency responder, these data points do not convey the building floor on which the caller is located. This lack of knowledge can hinder response efforts, especially in scenarios where the caller is unable to verbally communicate their location, such as during active shooter situations, when fleeing from a fire, or in cases of medical distress where the caller may be unconscious, disoriented, or otherwise incapacitated. In such situations, the ability to accurately and rapidly determine the caller floor level can mean the difference between life and death.

The public emergency-calling system in the United States (9-1-1) has a service architecture that is governed by a set of open standards developed and maintained by the National Emergency Number Association (NENA). An emergency call initiated by a caller typically originates on a network of a commercial wireless carrier such as AT&T, Verizon, or T-Mobile, for example. Various types of data are typically embedded within an emergency call made on a smart phone or other modern communication device. This data typically includes location-related data such as geographic coordinates and supplemental information such as barometric pressure. The emergency call is routed through carrier infrastructure to an emergency services IP backbone network (ESInet), a specialized network that routes the emergency call to an emergency call center (ECC) appropriate to the caller location.

Within this public emergency-calling system architecture, the ECC and other entities along the call routing path may attempt to determine the vertical position of the caller using available data. Once the ECC receives the call, a call handler relays the location information to a dispatch center, which deploys a field responder to the latitude/longitude coordinates or civic address of the caller. The availability and accuracy of vertical location data is dependent on multiple factors including the carrier and its network implementation, the ECC, and the technical capabilities of the calling device. Emergency responders may receive no vertical information at all, leaving them without actionable insight into the floor level of a caller within a multi-floor building.

The Federal Communications Commission (FCC) has mandated that wireless calling devices such as smartphones that are equipped with barometric pressure sensors include uncompensated barometric pressure (UBP) in data packets transmitted during an emergency call. This requirement, which is outlined in FCC Document No. 15-9, Fourth Report and Order (adopted on Jan. 29, 2015 and formally released on Feb. 3, 2015), applies when a call for emergency assistance such as a 9-1-1 call is placed. While the horizontal components of the caller location are typically conveyed in the form of coordinates (latitude and longitude) or a street address, the vertical component requires additional sensor-derived input such as barometric pressure. The FCC requirement to include UBP data in the emergency call data is intended to allow systems within the emergency services call path to compute the vertical (z-axis) position of the caller.

One metric for estimating vertical location from data included in a wireless emergency call is height above ellipsoid (HAE). HAE represents elevation relative to a mathematical reference surface—an ellipsoid—that is a standardized geodetic model of the Earth used in positioning systems. HAE is calculated using barometric pressure as measured by the smartphone in combination with atmospheric and geospatial data retrieved from external databases-data that typically lacks specific, localized context. HAE calculations are typically performed by entities within the emergency call routing infrastructure and in reliance on data that must be retrieved from third-party or cloud-based databases. Some organizations, including the Association of Public-Safety Communications Officials (APCO), have expressed concerns about the reliability of HAE as an indicator of vertical position. APCO states in FCC fact sheet DOC-360516A that it does not consider HAE to be an actionable metric for its field responders.

Private emergency services providers operating in corporate, industrial, or campus environments, as well as military and other governmental or security-focused organizations, may employ service architectures that differ from the standardized public 9-1-1 system described above. These architectures may utilize proprietary communication networks, secure data handling protocols, or mission-specific hardware and software configurations. Despite these differences, the fundamental need remains the same: the ability to accurately determine the vertical position of a caller within a multistory structure.

The inclusion of any information in this background section should not be construed as an admission that such information constitutes prior art. This section may describe aspects of the subject invention and related concepts.

SUMMARY

The following summary relates to one or more aspects or embodiments disclosed herein. It is not intended to provide a comprehensive overview of all contemplated aspects or embodiments, nor should it be construed as identifying key or essential features limiting the scope of any particular aspect or embodiment. Rather, this summary presents certain concepts in a simplified form as a prelude to the detailed description that follows.

Aspects of this disclosure provide a practical and technologically grounded approach for determining vertical position within a multi-floor building. The system of this disclosure is particularly well-suited for emergency response scenarios where conventional positioning technologies, such as GPS, are ineffective. The disclosed system estimates the vertical distance between two physically distinct wireless communication devices—each incorporating a barometric pressure sensor—by processing real-time environmental inputs including barometric pressure, ambient temperature, and relative humidity. Measurements of these metrics are directly captured from real time sensors incorporated in or proximate to the devices.

Aspects of this disclosure provide a computer-based method for determining vertical displacement between two devices by comparing their barometric pressure readings and accounting for ambient temperature and relative humidity. In particular, the barometric pressure included in emergency data from a caller device is compared to the barometric pressure sensed by an on-location device of an emergency responder, enabling the system to determine a height difference between the devices. The floor level of the caller is determined from this height difference, thereby generating a practical output for use in locating individuals within multi-floor structures. Importantly, the determination of the floor level of the caller is made autonomously and without any requirement for access to external databases, remote infrastructure, or third-party network services. Thus, this disclosure addresses a technical problem rooted in the limitations of existing location determination technologies and offers a technological solution implemented by a system comprising hardware and software components working in concert with environmental measurements from hardware sensors.

Additional aspects of this disclosure are described in greater detail below and are illustrated in the accompanying drawing figures.

BRIEF DESCRIPTION OF THE DRAWINGS

The following description and accompanying drawings illustrate various features and advantages of this disclosure. The drawings are not necessarily to scale, as emphasis is placed on illustrating the principles of the disclosure. Like reference characters may be used to indicate the same components across different figures and views. The drawings provide illustrative examples and should not be construed as limiting the scope of this disclosure.

DETAILED DESCRIPTION

The embodiments described herein are not intended to limit the invention to the precise forms disclosed, nor are they exhaustive. Rather, various embodiments are provided to facilitate understanding by those skilled in the art. The terms "exemplary" and "example", as used herein, refer to instances or illustrations and should not be construed as limiting or as indicating a preferred or advantageous embodiment relative to other embodiments.

Determining the vertical position of an emergency caller within a multi-floor or multi-story building is critical to the success of a field responder. Barometric pressure is inversely correlated with vertical height—the air pressure at higher altitudes is lower because there is less atmospheric mass exerting downward force, and vice-versa. For this reason, the FCC has mandated that the barometric pressure of the caller device be included within the data that is automatically transmitted during the emergency call. Various methods, including height above ellipsoid (HAE), height above sea level (HSL), and height above ground level (HGL) have been developed to estimate vertical height based on barometric pressure. These methods rely on global or regional geographic and atmospheric data in combination with barometric pressure data to derive absolute metrics of vertical height. These metrics are considered absolute because they calculate height relative to globally or regionally defined data or reference surfaces-such as a geodetic ellipsoid or mean sea level-rather than in relation to an actual device or user, and they typically require access to external data sources, such as geodetic models, topographical elevation maps, real-time weather data, and other sources of data in order to generate their metric.

Although such absolute metrics are meaningful in a broad geographic context, they fail to provide the type of specific, localized information that is needed during emergency scenarios in multi-floor buildings. First responders are less concerned with abstract elevation values and are instead focused on identifying the specific floor on which a caller is located—an actionable unit of location that cannot be reliably inferred from global absolute metrics alone. This disclosure addresses that gap by providing a method for determining the vertical distance between the device of an emergency caller and the device of an on-site field responder, from which the floor of the caller is derived and presented directly to the responder to support rapid and accurate rescue. Importantly, the method does not rely on data or infrastructure that is external to the two devices. Instead, using caller barometric pressure obtained from the emergency call data in combination with responder barometric pressure, temperature, and humidity obtained from the on-site responder device, the vertical distance between the devices and the floor number of the caller are determined.

Figure 1:
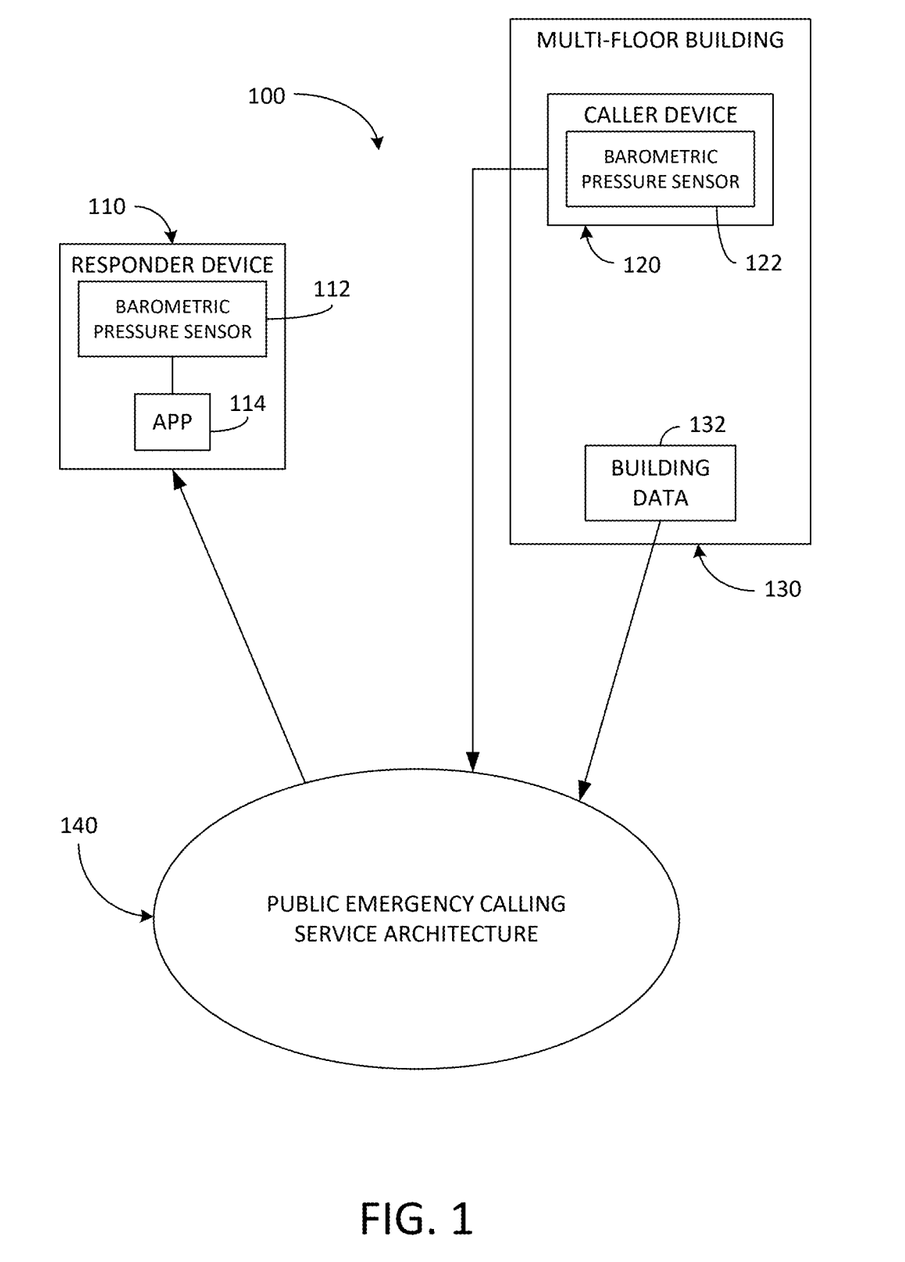
FIG. 1 is a conceptual diagram of an emergency response communication environment comprising a responder device, a caller device located within a multi-floor building, and a public emergency-calling service architecture, according to aspects of this disclosure.

FIG. 1 is a conceptual diagram of an emergency response communication environment 100 comprising a field responder device 110, a caller device 120 located within a multi-floor building 130 from which an emergency call is placed, and a public emergency-calling service architecture 140, according to aspects of this disclosure. In some examples, responder device 110 and caller device 120 are wireless communication devices such as smartphones, smartwatches, tablets, headsets, or other portable devices capable of networked communication. Modern wireless communication devices such as smartphones are equipped with a variety of onboard environmental sensors, typically implemented as microelectromechanical systems (MEMS), that are accessible to software applications through standardized application programming interfaces (APIs). In this regard, as can be seen in FIG. 1, field responder device 110 is configured with a barometric pressure sensor 112, and caller device 120 is configured with a barometric pressure sensor 122. In some examples, sensors 112 and 122 measure atmospheric pressure by detecting minute changes in force exerted by the air on a flexible membrane within the sensor structure, which in turn alters an electrical property such as capacitance or resistance that is converted into a pressure value.

Public emergency calling service architecture 140 receives emergency calls from a device such as caller device 120, extracts relevant information and data from those calls, and routes that information and data to responder device 110 of a field responder. In some examples, an emergency call initiated by caller device 120 is transmitted over a commercial wireless carrier network and routed through an Emergency Services IP Network (ESInet) to an emergency call center (ECC) appropriate to the caller location. Embedded within the emergency call are various data fields, including the geographic coordinates of device 120 and the barometric pressure at the location of device 120 as reported by barometric pressure sensor 122. This data is conveyed from the ECC or other infrastructure of service architecture 140 to field responder device 110, either directly or through connected systems.

Figure 2:
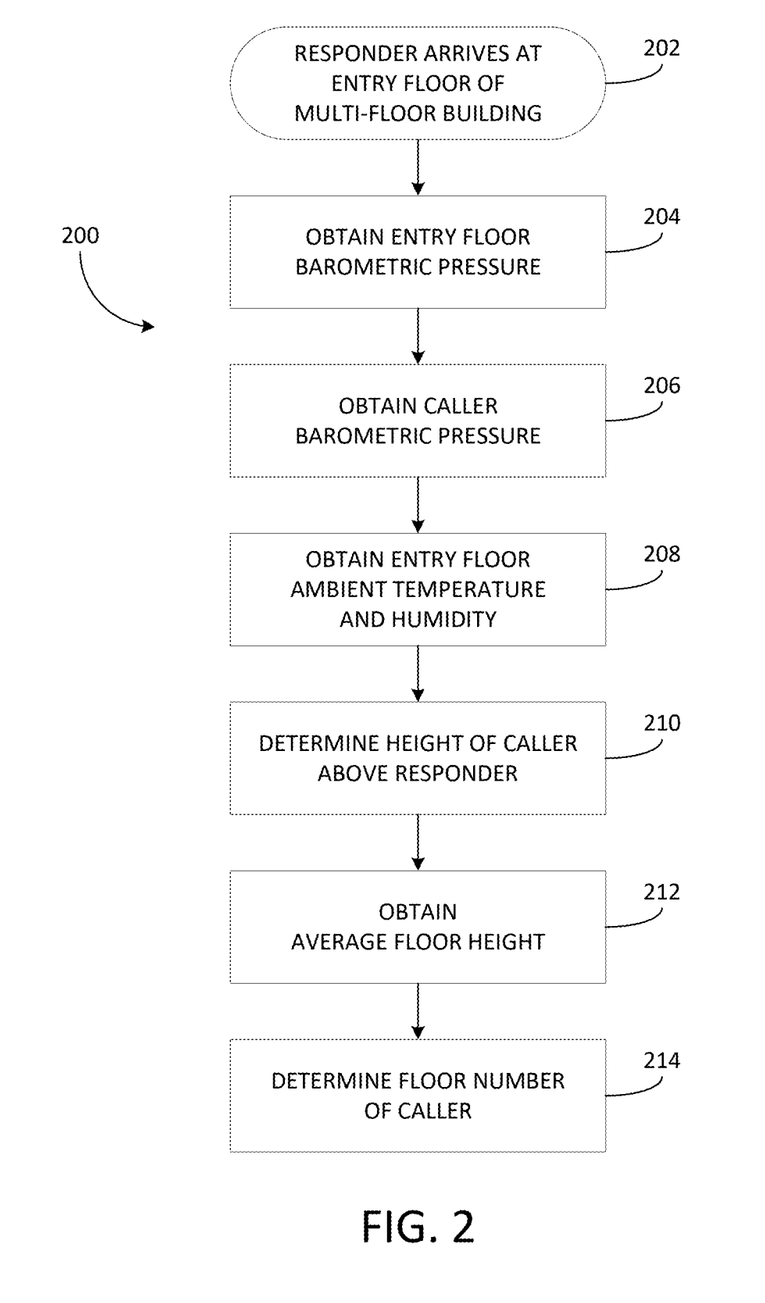
FIG. 2 is a flow diagram of method for determining vertical position in a multi-floor building, according to aspects of this disclosure.

FIG. 2 is a flow diagram of a method 200 for determining vertical position in a multi-floor building, according to aspects of this disclosure. In particular, with reference to FIG. 1, method 200 determines the floor number of caller device 120 within multi-floor building 130. In some examples, method 200 is implemented as mobile software application (app) 114 that is executed on responder device 110 of the field responder who arrives at the entry floor of multi-floor building 130 from which the emergency call from caller device 120 originated. The field responder may be, for example, a police officer, firefighter, emergency medical technician, or other appropriate emergency personnel. In this description, the floor of multi-floor building 130 at which the field responder initially arrives and initiates application 114 is referred to as the entry floor, and the position of caller device 120 is expressed relative to the entry floor.

While method 200 is typically implemented locally on responder device 110, alternative configurations are also contemplated. For example, method 200 may be instantiated on a server hosted within a private and secure internet environment maintained by the agency that provides the emergency service. Upon entering the building, the field responder may launch an application on their mobile device that initiates a connection to the server. Barometric pressure data from both responder device 110 and caller device 120 may then be transmitted to the server, either directly or through public emergency calling service architecture 140 (which may comprise the server). The vertical differential between the two devices, along with the floor number of the caller, may then be determined by the server and returned to responder device 110. The determined floor number may also be provided to a dispatcher or other coordination systems to support incident command and response planning. This architecture may be particularly beneficial in scenarios requiring centralized oversight or integration with broader emergency communication systems.

The following description of method 200 is primarily in the context of a local implementation on responder device 110. In step 202 of method 200, the operator of responder device 110 arrives at the entry floor of multi-floor building 130 and invokes mobile software application 114, which may be implemented as a native application that executes on the operating system of field responder device 110, such as iOS or Android. Application 114 is a software program stored in memory and executed by one or more processors of the responder device 110. When invoked, application 114 interfaces with hardware components, including barometric pressure sensor 112, through operating system APIs. Application 114 includes a user interface (UI), conceptually illustrated in FIGS. 3A-3C, that receives input from and presents information to the field responder on responder device 110.

In step 204, application 114 accesses barometric pressure sensor 112 integrated within responder device 110 to obtain the entry floor barometric pressure. This measurement represents ambient pressure conditions at the entry floor of building 130 and serves as a reference point for determining the relative height difference between responder device 110 and caller device 120. The entry floor barometric pressure as obtained from barometric pressure sensor 112 is recorded by application 114 and stored in memory for use in subsequent steps of method 200.

In step 206, application 114 obtains the caller barometric pressure from caller device 120, which is captured by the onboard barometric pressure sensor 122 of caller device 120 and transmitted as part of the emergency call initiated by device 120 and delivered to field responder device 110 via public emergency calling service architecture 140. The caller barometric pressure may be embedded within the metadata of the emergency call or transmitted as supplemental data through an associated data channel or system supporting the emergency call. Application 114 receives the caller barometric pressure either automatically upon call dispatch or in response to a request, and stores it in memory for subsequent comparison with the entry floor barometric pressure obtained in step 204

In some examples, step 206 may periodically or continuously update the caller barometric pressure reading from caller device 120 in real time. This functionality is particularly useful in dynamic scenarios where the caller may be moving within building 130, such as during an active shooter incident, a spreading fire, or other evolving emergency conditions that may require responders to track vertical movement over time.

In step 208, application 114 obtains ambient temperature and relative humidity values corresponding to conditions at the entry floor of multi-floor building 130. These values may be automatically retrieved from onboard environmental sensors (if available), manually entered by the field responder via the user interface of application 114, or default values may be used. The ambient temperature measurement may be obtained, for example, from an onboard ambient temperature sensor in responder device 110, from manual entry by the field responder based on a reading taken from a building-installed or personal thermometer or other suitable measuring instrument, or by use of a default average room temperature value such as 74° F. Likewise, the relative humidity measurement may be obtained from an onboard relative humidity sensor in responder device 110, from manual entry by the field responder based on a reading taken from an appropriate relative humidity measuring instrument, or by use of a default relative humidity value such as 50%. The temperature and humidity values obtained by application 114 are stored in memory and used in subsequent steps of method 200.

In step 210, application 114 determines the vertical height difference, referred to as Z, between responder device 110 situated on the entry floor of building 130 and caller device 120 situated on an unknown floor of building 130. This determination, which may also be referred to as the vertical height of caller device 120 above responder device 110, or caller height, is based on the principle that air pressure decreases as elevation increases. By comparing the barometric pressure reported by responder device 110 at the entry floor of building 130 with the barometric pressure reported by caller device 120, method 200 can determine how far above the entry floor caller device 120 is located. The height determination of step 210 is made by application 114 in accordance with equation (1):

$$Z = \frac{R\overline{T_v}}{g} \ln\left[\frac{P(0)}{P(Z)}\right] \quad (1)$$

In equation (1), Z is the vertical height expressed in meters (m), which may be converted to feet if needed, of caller device 120 above responder device 110; P(0) is the barometric pressure in hectopascals (hPa) at the entry floor of building 130 as read by barometric pressure sensor 112 of responder device 110; P(Z) is the barometric pressure (hPa) at the location of caller device 120 as read by its barometric pressure sensor 122; ln is the logarithm to base e; $T_v$ is the virtual room temperature (° K), which is a corrected version of the room temperature obtained by application 114 that takes into account the relative humidity obtained by application 114; $\overline{T_v}$ is the numerical average of virtual temperatures $T_v$ calculated at the two positions were P(0) and P(Z) were measured; R is a specific gas constant for dry air, having a value of 287.053 joules per kilogram per degree Kelvin (J/kgK), that represents how air expands and contracts with temperature and pressure; and g is standard acceleration due to gravity, which has a constant value of 9.80665 m/s².

The virtual temperature $T_v$ is determined in accordance with equation (2):

$$T_v = T\left(1 + \frac{0.378 e_s H_r}{P}\right) \quad (2)$$

In equation (2), $T_v$ is the virtual temperature, $e_s$ is the saturation vapor pressure of water in air at temperature T in hPa, $H_r$ is the relative humidity expressed as a fraction between 0 and 1, and P is the atmospheric pressure at the location.

After determining the vertical height difference (caller height) in step 212, application 114 obtains an average floor height for building 130 in which caller device 120 is located (step 212). In one embodiment, the average floor height is assumed to be an average or uniform floor-to-floor distance and may be preloaded as a default setting (e.g., 10 feet or about 3.05 meters per floor). Alternatively, the average floor height may be manually entered by the field responder based on available knowledge of building 130 and/or local standards. As will be explained in more detail below, step 212 may gather additional floor information beyond average floor height, such as whether there is a mezzanine (and if so, its height), the height of the entry floor (if it differs from average floor height), and whether building 130 is missing the thirteenth floor and/or other floors.

Figure 3A:
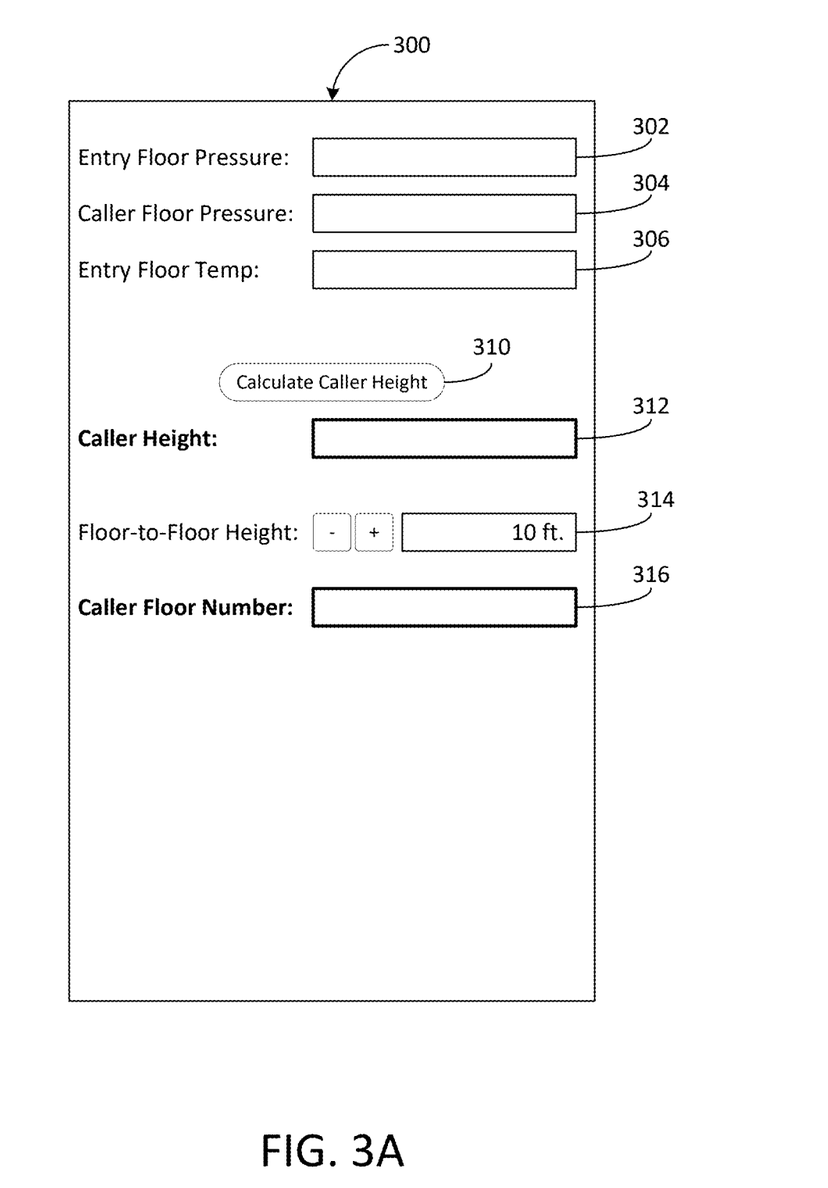
FIG. 3A is a conceptual diagram of an exemplary mobile application user interface implementing an embodiment of the method of FIG. 2 in which a default relative humidity value is used in the vertical position determination, according to aspects of this disclosure.
Figure 3B:
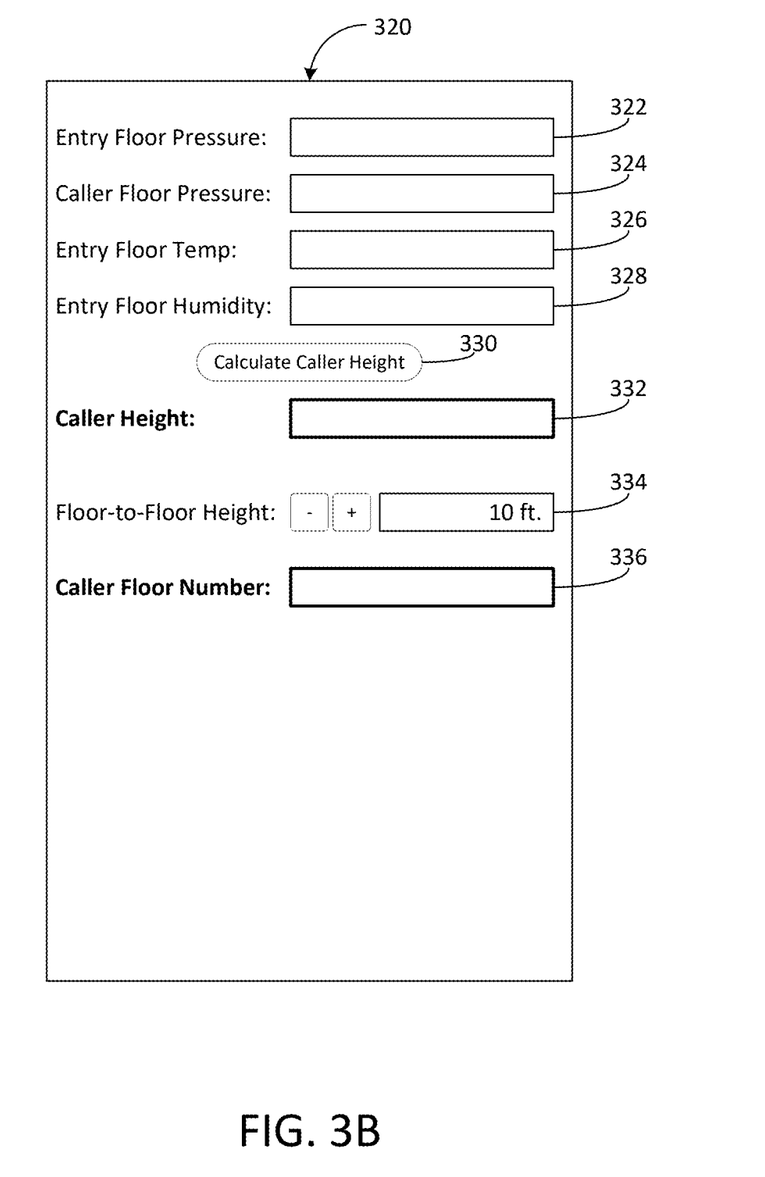
FIG. 3B is a conceptual diagram of an exemplary mobile application user interface implementing another embodiment of the method of FIG. 2 in which an externally-measured or internally-sensed relative humidity value is used in the vertical position determination, according to aspects of this disclosure.
Figure 3C:
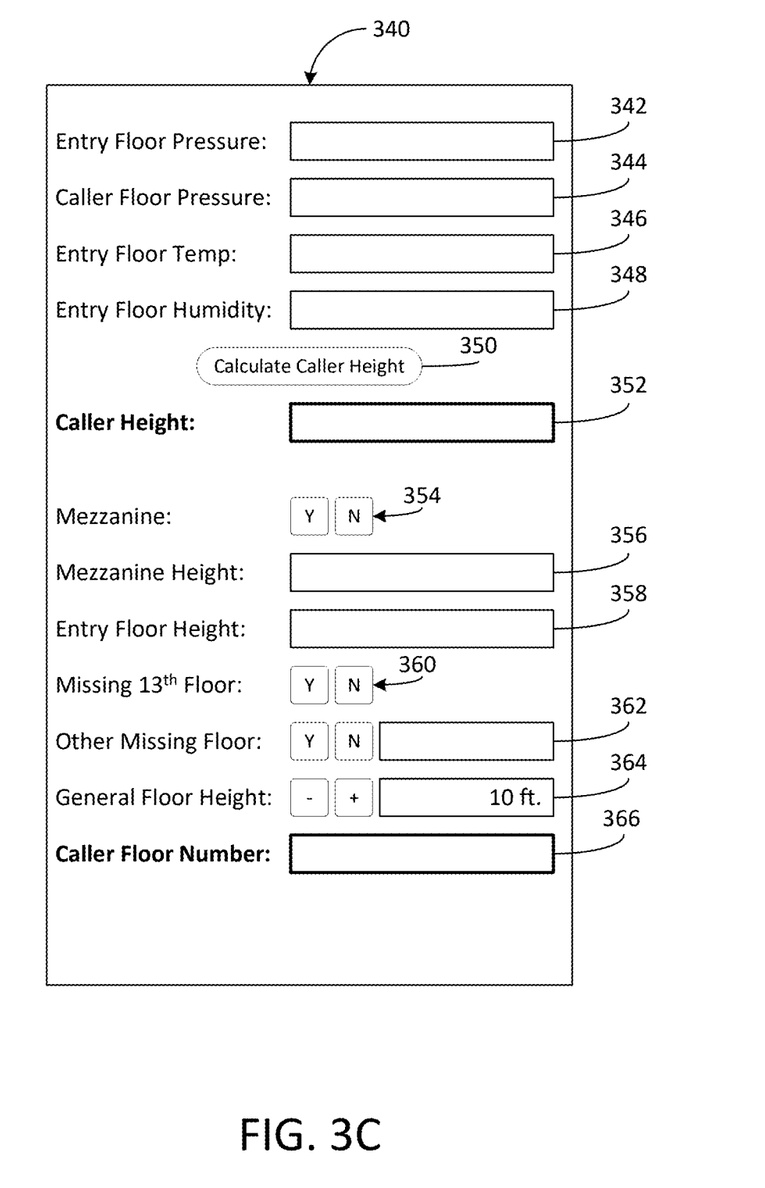
FIG. 3C is a conceptual diagram of an exemplary mobile application user interface implementing another embodiment of the method of FIG. 2 that considers additional floor information beyond average floor height, according to aspects of this disclosure.

In step 214, after determining the vertical height difference between responder device 110 and caller device in step 210 and obtaining the average floor height in step 212, application 114 determines the floor on which caller device 120 is located by dividing the caller height (height differential between caller device 120 and responder device 110) by the average floor height. The result may be rounded to the nearest whole number and displayed in the user interface of application 114 (as shown in FIGS. 3A-3C) to assist the responder in locating the caller within building 130. In some implementations, the determined floor number may be visually annotated or adjusted to reflect any uncertainty arising from factors such as sensor variability, the stack effect (described below), and floor-to-floor height variation.

FIGS. 3A-3C are conceptual diagrams of exemplary user interfaces of mobile application 114 implementing different embodiments of vertical position determination method 200 of FIG. 2, according to aspects of this disclosure. The examples shown in FIGS. 3A-3C are illustrative and non-limiting, and alternative layouts, features, and data flows may be employed without departing from the scope of this disclosure.

FIG. 3A is a conceptual diagram of an exemplary user interface 300 of application 114 implementing an embodiment of method 200 in which a default relative humidity value is used in the vertical position determination, according to aspects of this disclosure. In step 204, the entry floor pressure is automatically obtained by application 114 from barometric pressure sensor 112 of responder device 110 and populated into entry floor pressure field 302 of user interface 300 (FIG. 3A). In step 206, the caller floor pressure is automatically obtained by application 114 from barometric pressure sensor 122 of caller device 120 and populated into caller floor pressure field 304 of interface 300. In step 208, an entry floor temperature measurement is obtained and populated into entry floor temperature field 306. The temperature may be obtained, for example, from an onboard ambient temperature sensor in responder device 110, from manual entry by the field responder based on a reading taken from a building-installed or personal thermometer or other suitable measuring instrument, or by use of a default average room temperature value such as 74° F.

In the embodiment of FIG. 3A, the relative humidity measurement is obtained in step 208 by use of a default relative humidity value such as 50%. Thus, in this embodiment and as shown in FIG. 3A, there may be no field provided for entry of a relative humidity measurement. In step 210, application 114 determines the vertical height difference Z between responder device 110 and caller device 120 by using (in the calculation of $T_v$) a default value for relative humidity in combination with the sensed, entered, or default room temperature that is obtained in step 208. In some examples, user interface 300 provides a mechanism such as "Calculate Caller Height" button 310 for initiating step 210. In other examples, the caller height determination of step 210 may be automatically initiated once the required information (barometric pressures, temperature, humidity) has been obtained in steps 204-208. Once determined, the caller height may be displayed in caller height field 312 of application 300.

In step 212, the average floor height of building 130 is obtained by application 114. User interface 300 provides an average floor height or "Floor-to-Floor Height" field 314 for entry of this information in step 212. As can be seen in FIG. 3A, field 314 may be pre-populated with an average or default value for the average floor height, such as 10 feet for example. In step 214, application 114 determines the floor number of the caller by dividing the caller height (field 312) by the average floor height (field 314), and displays the determined caller floor number in field 316 of interface 300.

FIG. 3B is a conceptual diagram of an exemplary user interface 320 of mobile application 114 implementing another embodiment of method 200 in which an externally-measured or internally-measured relative humidity value is used in the vertical position determination, according to aspects of this disclosure. In step 204, the entry floor pressure is automatically obtained by application 114 from barometric pressure sensor 112 of responder device 110 and populated into entry floor pressure field 322 of user interface 320 (FIG. 3B). In step 206, the caller floor pressure is automatically obtained by application 114 from barometric pressure sensor 122 of caller device 120 and populated into caller floor pressure field 324 of interface 320. In step 208, an entry floor temperature measurement is obtained and populated into entry floor temperature field 326. The temperature may be obtained, for example, from an onboard ambient temperature sensor in responder device 110, from manual entry by the field responder based on a reading taken from a building-installed or personal thermometer or other suitable measuring instrument, or by use of a default average room temperature value such as 74° F.

In the embodiment of FIG. 3B, the relative humidity measurement is obtained in step 208 by manual entry into field 328 by the field responder of a relative humidity value as measured using an appropriate instrument. Alternatively, the relatively humidity measurement may be obtained in step 208 directly from an appropriate humidity sensor configured within responder device 110 and populated into field 328. In step 210, application 114 determines the vertical height difference Z between responder device 110 and caller device 120 by using (in the calculation of $T_v$) the manually-entered or sensed value for relative humidity (field 328) in combination with the sensed, entered, or default room temperature (field 326) that is obtained in step 208. In some examples, user interface 320 provides a mechanism such as "Calculate Caller Height" button 330 for initiating step 210. In other examples, the caller height determination of step 210 may be automatically initiated once the required information (barometric pressures, temperature, humidity) has been obtained. Once determined, the caller height may be displayed in caller height field 332 of application 320.

In step 212, the average floor height of building 130 is obtained by application 114. User interface 320 provides an average floor height or "Floor-to-Floor Height" field 334 for entry of this information in step 212. As can be seen in FIG. 3B, field 334 may be pre-populated with an average or default value for the average floor height, such as ten feet for example. In step 214, application 114 determines the floor number of the caller by dividing the caller height (field 332) by the average floor height (field 334), and displays the determined caller floor number in field 336 of interface 300.

FIG. 3C is a conceptual diagram of an exemplary user interface 340 of mobile application 114 implementing another embodiment of method 200 that considers additional floor information beyond average floor height, such as whether there is a mezzanine (and if so, its height), the height of the entry floor (if it differs from average floor height), and whether building 130 is missing the thirteenth floor and/or other floors, according to aspects of this disclosure.

In step 204, the entry floor pressure is automatically obtained by application 114 from barometric pressure sensor 112 of responder device 110 and populated into entry floor pressure field 342 of user interface 340 (FIG. 3C). In step 206, the caller floor pressure is automatically obtained by application 114 from barometric pressure sensor 122 of caller device 120 and populated into caller floor pressure field 344 of interface 340. In step 208, an entry floor temperature measurement is obtained and populated into entry floor temperature field 346. The temperature may be obtained, for example, from an onboard ambient temperature sensor in responder device 110, from manual entry by the field responder based on a reading taken from a building-installed or personal thermometer or other suitable measuring instrument, or by use of a default average room temperature value such as 74° F.

In the embodiment of FIG. 3C, the relative humidity measurement is obtained in step 208 by manual entry into field 348 by the field responder of a relative humidity value as measured using an appropriate instrument or a default relative humidity value (such as 50%). Alternatively, the relatively humidity measurement may be obtained in step 208 directly from an appropriate humidity sensor configured within responder device 110 and populated into field 348. In step 210, application 114 determines the vertical height difference Z between responder device 110 and caller device 120 by using (in the calculation of $T_v$) the manually-entered, sensed, or default value for relative humidity (field 348) in combination with the sensed, entered, or default room temperature (field 346) that is obtained in step 208. In some examples, user interface 340 provides a mechanism such as "Calculate Caller Height" button 350 for initiating step 210. In other examples, the caller height determination of step 210 may be automatically initiated once the required information (barometric pressures, temperature, humidity) has been obtained. Once determined, the caller height may be displayed in caller height field 352 of application interface 340.

The embodiment of method 200 reflected by application interface 340 of FIG. 3C addresses the fact that floor-to-floor distance is not uniform in some buildings. In the embodiment of FIG. 3C, step 212 collects additional floor information beyond the average floor-to-floor height. For example, as selected using field 354 (which may comprise Y or N buttons, for example), building 130 may or may not include a mezzanine floor between the entry floor and the second floor. If a mezzanine floor is present, application interface 340 may include a field 356 to enter the mezzanine floor height. In many buildings, the height of the entry floor may be substantially greater than the average floor-to-floor height. Field 358 is provided to specify the entry floor height. Some buildings may be missing a thirteenth floor, which may be indicated in field 360, or may be missing other floors, which may be indicated in field 362. As in the previous embodiments, a field 364 is also provided to enter the average floor height of building 130, and may be pre-populated with an average or default value for the average floor height, such as ten feet for example. In step 214, the caller floor number is determined from this information and displayed in field 366 of interface 340.

In some examples, pre-existing building-specific information—illustrated in FIG. 1 as building data 132—may be accessible to the field responder and may be used to populate additional floor information and other fields discussed with reference to FIG. 3C. Building data 132 may include information such as the height of individual floors, the presence or absence of mezzanine levels, the omission of specific floor numbers (such as the thirteenth floor), and entry floor heights that deviate from the building average. Additionally, building data 132 may account for pressure anomalies caused by the stack effect (described below), which can affect barometric readings within multi-floor buildings. Building data 132 may be made available to the field responder locally, such as by being stored in a responder-accessible location within building 130 (as shown in FIG. 1), and/or remotely via public emergency calling service architecture 140, which may maintain and store building data 132 in a database and automatically transmit it to application 114 of responder device 110, which may in turn populate the data into appropriate fields of application interface 340. By incorporating available building data 132 into floor height determination step 212, floor number determination accuracy may be enhanced in step 214, particularly in buildings where structural idiosyncrasies would otherwise cause floor determination errors.

The accuracy of the determined caller height (vertical displacement from responder) and caller floor may be affected by various factors. Chief among these factors are: (1) accuracy and calibration variations in the barometric pressure sensors in the respective devices; and (2) the stack effect, a physical phenomenon that is influenced by the characteristics of the individual building.

The barometric pressure sensors embedded in the caller and responder devices may originate from different manufacturers or production batches, and may exhibit differing levels of precision, drift over time, and aging properties. Initial calibration of the sensors may have been performed using instruments of different accuracies. Although the sensor industry continues to advance toward improved uniformity and tighter tolerances, inconsistencies between pressure readings from two different devices remain a potential source of error.

The stack effect can cause localized pressure deviations that are not accounted for in step 210 when the height of the caller is determined. The stack effect arises because buildings are not perfectly sealed environments. Infiltration of outside air and exfiltration of interior air, driven by differences in air density, can result in air flow that may create pressure differences that would not be present if the building were sealed. The magnitude and direction of the stack effect may vary seasonally, depending on whether the interior temperature is greater or less than the outside temperature, and is further influenced by the heating, ventilation, and air conditioning (HVAC) configuration in the building. The inventors have found that the stack effect may introduce an uncertainty of approximately plus or minus one floor in the caller floor determination. In some embodiments, estimated stack effect compensation values may be entered manually by the responder or retrieved from building data 132, allowing application 114 to adjust the determined floor number accordingly.

A key operational advantage of the disclosed system is that the responder obtains vertical location information—the floor number of the caller—only after arriving on site, using locally measured or entered environmental data. This avoids reliance on potentially imprecise or unavailable location data transmitted during the emergency call. By producing immediate results directly on responder device 110, the system enables floor-level location determination even in environments where access to external infrastructure or connectivity is limited, intermittent, or entirely absent. Vertical displacement between responder device 110 and caller device 120 is determined by a computer-implemented process that incorporates environmental inputs including barometric pressure, ambient temperature, and relative humidity. These values may be acquired from onboard sensors, manually entered by the responder, or obtained from building-specific data. Because the rate at which barometric pressure decreases with altitude is influenced by temperature and humidity, integrating all three inputs allows the system to compensate for these effects and produce a more accurate floor determination. The floor number is displayed in real time to the field responder, providing a concrete and actionable output that supports immediate search and rescue operations.

Figure 4:
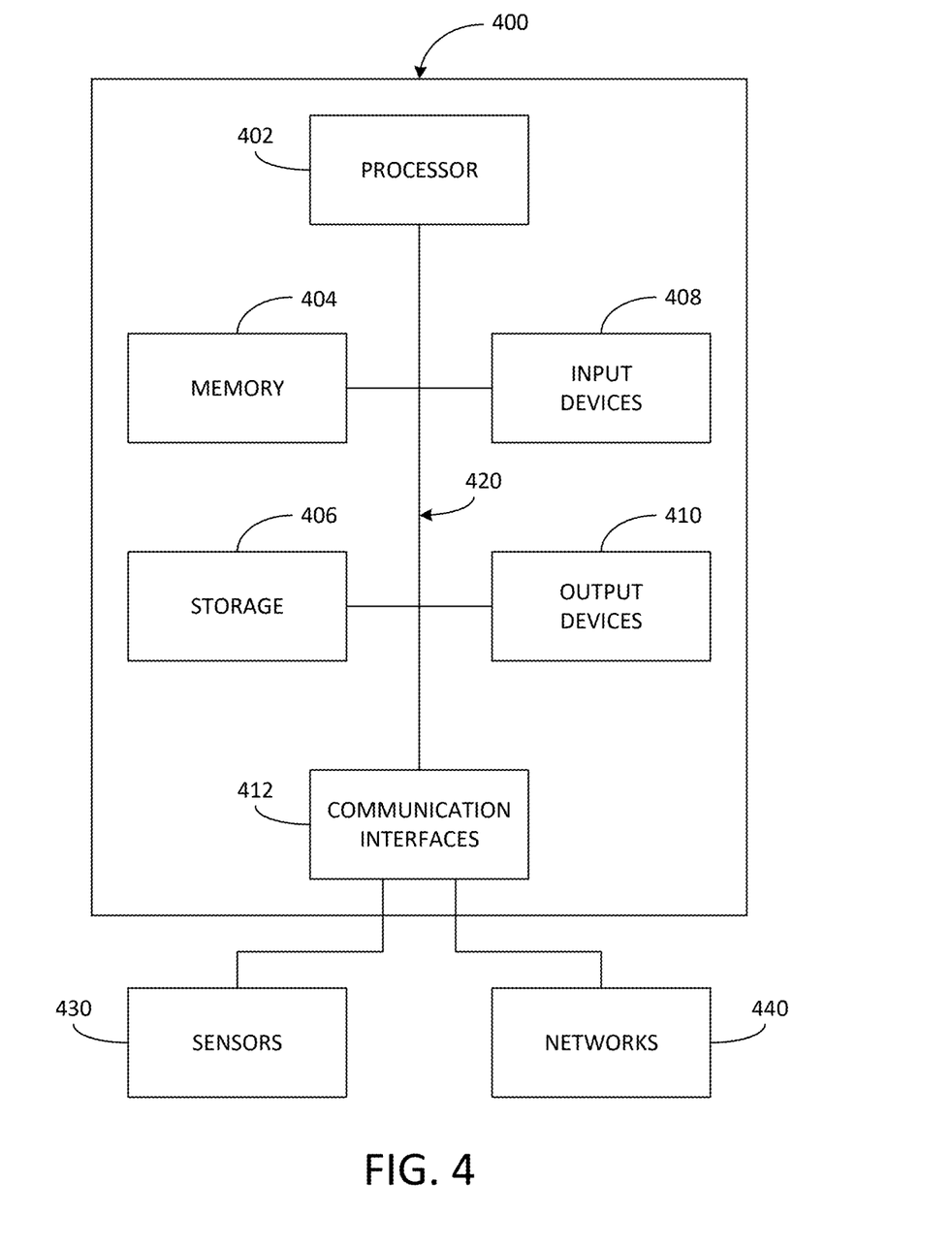
FIG. 4 is a block diagram of an exemplary computer system for implementing the system and method of this disclosure.

FIG. 4 is a block diagram of an exemplary computer system 400 for implementing the system and method of this disclosure, specifically for determining the vertical position of caller device 120 relative to responder device 110 during an emergency response. Computer system 400 may be implemented in field responder device 110 (such as a smartphone, tablet, watch, or other mobile device), as a cloud-based server hosted by a secure emergency service infrastructure, or as a computing platform supporting centralized emergency dispatch operations. Computer system 400 comprises processor 402, memory 404, storage 406, input devices 408, output devices 410, communication interfaces 412, and sensors 430, all interconnected via system bus 420 or another suitable interconnection architecture.

Processor 402 executes instructions stored in memory 404 to implement floor determination method 200. These instructions include launching mobile application 114, obtaining and comparing barometric pressure values, calculating vertical height differential Z, and determining the caller's floor number. Processor 402 may comprise various types of computing units, including a central processing unit (CPU), graphics processing unit (GPU), digital signal processor (DSP), application-specific integrated circuit (ASIC), or field-programmable gate array (FPGA), and may perform computations related to environmental data interpretation, sensor interfacing, and real-time user interface updates.

Memory 404 stores software instructions that enable processor 402 to execute vertical position determination method 200. These instructions include code for interfacing with barometric pressure sensors 112 and 122, calculating virtual temperature from ambient temperature and humidity, and presenting interactive user interfaces such as those illustrated in FIGS. 3A-3C. In some embodiments, memory 404 may store default values (e.g., average floor height, temperature, or humidity) and building-specific data 132. Memory 404 may comprise volatile memory (e.g., RAM) for real-time processing and non-volatile memory (e.g., flash storage or ROM) for persistent application data, such as configuration settings or stored emergency call metadata.

Storage 406 provides long-term data retention and may include solid-state drives (SSDs), embedded flash memory, cloud-accessible storage, or secure departmental databases. Storage 406 may store mobile application 114, operating system files, logs of recent emergency call data, and any locally stored building data 132. In server-based embodiments, storage 406 may be distributed across systems maintained by the emergency response agency, supporting access to caller metadata and other information received through emergency service architecture 140.

Computer system 400 may comprise one or more input devices 408, such as a touchscreen, keyboard, voice interface, or soft buttons presented via the UI, enabling the field responder to input temperature, humidity, floor height values, initiate the caller height calculation, and other operations. Output devices 410 may include a graphical display for rendering the user interfaces of FIGS. 3A-3C, allowing the field responder to view sensor data, calculated height differentials, and estimated floor numbers. Output devices may also include haptic or audio elements to alert the responder when needed, such as when a floor has been calculated or updated in real time.

Computer system 400 further comprises one or more communication interfaces 412 that enable wired or wireless connectivity to external systems. Communication interfaces 412 may include network interface cards (NICs), Wi-Fi modules, cellular radios, or Bluetooth transceivers. These interfaces support data exchange with public emergency calling service architecture 140, enabling receipt of the caller's barometric pressure reading and possible transmission of calculated caller floor data to a dispatcher or command center. In a cloud-based embodiment, communication interfaces 412 may facilitate secure transmission of raw sensor data to a remote server where processing and floor determination occur.

System bus 420 interconnects processor 402, memory 404, storage 406, input/output devices 408 and 410, and communication interfaces 412, facilitating data transfer between these components. System bus 420 may comprise a combination of address, data, and control buses, ensuring timely interaction between the responder, onboard sensors, and received emergency data. Computer system 400 receives external environmental input via sensors 430 and networked systems 440. As described herein, sensors 430 include barometric pressure sensors integrated within responder device 110 and caller device 120, and may also include integrated temperature and relative humidity sensors. Network 440 may include emergency data networks such as service architecture 140, building information databases, or environmental monitoring feeds supporting the delivery of building data 132 or pressure measurements.

Computer system 400 operates under the control of an operating system (OS), such as iOS, Android, or a real-time embedded system, which manages hardware resources and provides an execution environment for application 114. The OS resides in storage 406 and is loaded into memory 404 upon startup, enabling application 114 to interact with sensors 430, communication interfaces 412, and graphical output devices 410. The OS may also manage data security protocols relevant to emergency operations, including encryption of transmitted caller data and secure communication with agency servers.

In a field deployment, computer system 400 ensures that application 114 functions in real time to support critical emergency operations. Whether implemented entirely on the responder's device or partially offloaded to a secure agency server, computer system 400 provides the necessary computational framework to receive sensor inputs, calculate vertical displacement, and determine the caller floor number with minimal delay. This capability supports rapid search and rescue operations by reducing uncertainty about the caller location within multi-floor buildings and delivering accurate floor-level information directly to first responders and dispatch personnel.

While certain embodiments are described herein, they are provided by way of example only and do not limit the scope of this disclosure. Various modifications, substitutions and omissions may be made without departing from the spirit and scope of the invention. The methods and processes described herein are not limited to any particular sequence and may be used independently or in combination. Steps may be omitted, reordered, or added in different implementations. No aspect of this description should be interpreted as requiring any specific feature, component, or step as essential or indispensable. Many variations, modifications, and enhancements are possible, all of which fall within the scope of the invention as defined by the following claims.

The invention claimed is:

1. A method for determining a floor number of a caller within a multi-floor building, comprising:
   obtaining, by a responder device, an entry floor barometric pressure of an entry floor of the multi-floor building from a barometric pressure sensor configured within the responder device;
   receiving, by the responder device, a caller barometric pressure of a caller device of the caller;
   obtaining, by the responder device, an ambient temperature and a relative humidity of the entry floor;
   determining, by the responder device, a vertical height difference between the responder device and the caller device based on the entry floor barometric pressure, the caller barometric pressure, the ambient temperature, and the relative humidity;
   obtaining, by the responder device, an average floor height of the multi-floor building; and
   determining, by the responder device, the floor number of the caller based on the vertical height difference and the average floor height.

2. The method of claim 1, wherein at least one of the ambient temperature and the relative humidity is entered manually into the responder device by a field responder.

3. The method of claim 1, wherein at least one of the ambient temperature and the relative humidity is obtained from one or more sensors configured in the responder device.

4. The method of claim 1, further comprising retrieving building data comprising at least one of a presence of a mezzanine floor, a height of the mezzanine floor, a height of the entry floor, and omitted floor numbers.

5. The method of claim 4, wherein the responder device considers the building data when determining the floor number of the caller.

6. The method of claim 1, further comprising:
   continually or periodically receiving updated caller barometric pressure data; and
   updating the floor number of the caller in real time based on the updated caller barometric pressure data.

7. The method of claim 1, wherein the caller barometric pressure is received via a public emergency calling service architecture.

8. A field responder communication device comprising:
   a barometric pressure sensor configured to measure entry floor barometric pressure at an entry floor of a multi-floor building;
   a memory storing executable instructions; and
   a processor configured to:
      receive a caller barometric pressure of a caller device located within the multi-floor building;
      obtain an ambient temperature and a relative humidity of the entry floor;
      determine a vertical height difference between the field responder communication device and the caller device based on the entry floor barometric pressure, the caller barometric pressure, the ambient temperature, and the relative humidity;

obtain an average floor height of the multi-floor building; and determine the floor number of the caller device based on the vertical height difference and the average floor height.

9. The field responder communication device of claim 8, further comprising at least one of an ambient temperature sensor and a relative humidity sensor.

10. The field responder communication device of claim 8, wherein the processor is further configured to display a user interface that includes fields for the entry floor barometric pressure, the caller barometric pressure, the ambient temperature, the relative humidity, the determined vertical height difference, the average floor height, and the determined floor number.

11. The field responder communication device of claim 8, wherein the memory further stores building data comprising at least one of a presence of a mezzanine floor, a height of the mezzanine floor, a height of the entry floor, and omitted floor numbers.

12. The field responder communication device of claim 11, wherein the processor is further configured to consider the building data when determining the floor number of the caller.

13. The field responder communication device of claim 8, wherein the processor is further configured to:

continually or periodically receive updated caller barometric pressure data; and update the floor number of the caller device in real time based on the updated caller barometric pressure data.

14. The field responder communication device of claim 8, wherein processor is further configured to receive the caller barometric pressure via a public emergency calling service architecture.

15. A non-transitory computer-readable medium storing instructions that, when executed by processor of a responder device located on an entry floor of a multi-floor building, cause the responder device to:

obtain an entry floor barometric pressure from a barometric pressure sensor configured within the responder device;

receive a caller barometric pressure of a caller device located in the multi-floor building;

obtain an ambient temperature and a relative humidity of the entry floor;

determine a vertical height difference between the responder device and the caller device based on the entry floor barometric pressure, the caller barometric pressure, the ambient temperature, and the relative humidity;

obtain an average floor height of the multi-floor building; and determine the floor number of the caller device based on the vertical height difference and the average floor height.

16. The non-transitory computer-readable medium of claim 15, wherein the instructions further cause the responder device to allow at least one of the ambient temperature and the relative humidity to be entered manually into the responder device by a field responder.

17. The non-transitory computer-readable medium of claim 15, wherein the instructions further cause the responder device to obtain at least one of the ambient temperature and the relative humidity from one or more sensors configured in the responder device.

18. The non-transitory computer-readable medium of claim 15, wherein the instructions further cause the responder device to obtain building data comprising at least one of a presence of a mezzanine floor, a height of the mezzanine floor, a height of the entry floor, and omitted floor numbers.

19. The non-transitory computer-readable medium of claim 15, wherein the instructions further cause the responder device to:

continually or periodically receive updated caller barometric pressure data; and update the floor number of the caller device in real time based on the updated caller barometric pressure data.

20. The non-transitory computer-readable medium of claim 15, wherein the instructions further cause the responder device to receive the caller barometric pressure via a public emergency calling service architecture.

* * * * *